United States Patent [19]

Bertram et al.

[11] Patent Number: 4,691,132
[45] Date of Patent: Sep. 1, 1987

[54] SYNCHRONOUS MOTOR WITH TWO-POLE PERMANENT-MAGNET SOFT-MAGNETIC-CORE ROTOR

[75] Inventors: Leo Bertram, Stolberg, Fed. Rep. of Germany; Hugo Schemmann, Schaesberg, Netherlands

[73] Assignee: U.S. Philips Corporation, New York, N.Y.

[21] Appl. No.: 866,033

[22] Filed: May 21, 1986

[30] Foreign Application Priority Data

May 24, 1985 [DE] Fed. Rep. of Germany ....... 3518697
May 24, 1985 [DE] Fed. Rep. of Germany ....... 3518696

[51] Int. Cl.[4] .................... H02K 1/22; H02K 21/08
[52] U.S. Cl. .................................. 310/156; 310/49 R
[58] Field of Search ............. 310/40 MM, 49 R, 156, 310/261, 162, 153

[56] References Cited

U.S. PATENT DOCUMENTS

| 1,385,038 | 7/1921 | Bohli ................................. 310/156 |
| 1,979,813 | 11/1934 | Reis .................................. 310/156 |
| 2,985,779 | 5/1961 | Flaningham ....................... 310/156 |
| 4,535,263 | 8/1985 | Avery ................................ 310/156 |

FOREIGN PATENT DOCUMENTS

| 1009713 | 6/1957 | Fed. Rep. of Germany ...... 310/156 |
| 1261235 | 8/1968 | Fed. Rep. of Germany . |
| 3403041 | 8/1985 | Fed. Rep. of Germany . |
| 82843 | 11/1918 | Switzerland ....................... 310/156 |
| 217877 | 3/1941 | Switzerland ....................... 310/156 |
| 2099234 | 12/1982 | United Kingdom . |

OTHER PUBLICATIONS

Ruschmeyer, K., "Motoren und Generatoren als Dauermagneten", 1983, Expert Verlag, pp. 35–37.
Diefenbach et al, "Rotierender Antrieb für ein Gerät mit oszillierender Arbeitsbewegung", ETZ, Book 30, vol. 2, pp. 56–60.

*Primary Examiner*—Peter S. Wong
*Assistant Examiner*—D. L. Rebsch
*Attorney, Agent, or Firm*—F. Brice Faller

[57] ABSTRACT

Single phase synchronous motor with a two-pole permanent-magnet rotor (5), coils (9) designed for nominal operation and a stator iron (7) which carries the coils (9) to produce a two-pole stator field between the stator poles (13). The rotor elements (19, 23) produce pulsating torques and are made of hard-magnetic and soft-magnetic materials, the pulsating torques comprising average-value and alternating components. The motor is constructed so that the alternating components are in phase opposition and tend to cancel each other during nominal operation. Elements producing the pulsating torques comprise a soft-magnetic central part and hard-magnetic permanent magnets arranged on opposite sides thereof.

13 Claims, 14 Drawing Figures

SYNCHRONOUS MOTOR WITH TWO-POLE PERMANENT-MAGNET SOFT-MAGNETIC-CORE ROTOR

BACKGROUND OF THE INVENTION

The invention relates to a single-phase synchronous motor comprising a two-pole permanent-magnet rotor between two electromagnetically excited stator poles.

A two-pole single-phase synchronous motor comprising a permanent-magnet rotor is known from the magazine ETZ, Vol. 30, 1978, No. 2, pages 53 to 60. The rotor comprises a diametrally magnetized anisotropic permanent magnet which is sintered in one piece and which is formed with a bore through which the rotor shaft extends. The manufacture of such cylindrical high-grade permanent magnets formed with anaxial bore is difficult if the rotor length or the ratio between the rotor length and the rotor diameter exceeds specific values. The power ratings of these motors, which are generally dimensioned for short-time operation, therefore do not exceed 25 W.

From the article by Karl Ruschmeyer, "Motoren und Generatoren mit Dauermagneten", in Vol. 123 of the series "Kontakt und Studium", edited by Prof. Dr. Ing. Wilfried J. Bartz, and published by the Expert Verlag, 1983, pages 36 and 37, d.c. motors are known in which a soft-magnetic iron core is provided with hard-magnetic permanent magnets. The permanent magnets are arranged side by side at a distance from each other along the peripheral surface of the iron core. These permanent magnets form poles of alternate polarity. The soft-magnetic iron core is radially symmetrical. The permanent magnets are rare-earth magnets, which are expensive. The use of small magnet blocks is therefore advantageous in comparison with solid rotors of a rare-earth magnet material.

A further disadvantage of single-phase synchronous motors with permanent-magnet rotors as described in ETZ is that these motors exhibit comparatively large fluctuations of the instantaneous angular velocity with a frequency of 100 Hz, which fluctuations may have amplitudes of more than ±30% of the synchronous angular velocity. These fluctuations may be attributed to the alternating torque which is inevitable during pure single-phase operation and to the magnetic detect torque. In order to improve the synchronious operation it is known from DE-AS No. 14 88 267 to compensate for the alternating torque by means of an additional magnet which rotates in a separate magnetic circuit. However, this method is intricate and results in a larger motor volume.

When high-grade magnet materials with a high remanent induction are used, as in the case of rare-earth materials, starting is affected by transient oscillations (DE-PS No. 34 03 041). Moreover, the starting voltage at which a correct starting of the motor is ensured increases. In accordance with DE-PS No. 34 03 041 transient oscillations can be avoided, in that the moment of inertia and the air gap, which also determines the detent torque, are influenced in such a way that a natural frequency of the system which comprises the rotor and the load and which oscillates freely with a low amplitude is unequal to the input voltage frequency.

SUMMARY OF THE INVENTION

It is the object of the invention to provide a single-phase synchronous motor of the kind defined in the opening paragraph, in which the synchronous operation of the motor is improved in an economic manner and in which transient oscillations, which lead to a higher starting voltage, are avoided whilst a correct synchronous operation is maintained.

In accordance with the invention the rotor comprises soft-magnetic block-shaped central part which is diametrally-symmetrical relative to the rotor axis and which has a longer dimension and a shorter dimension transverse to the rotor axis, permanent magnets having magnet poles being arranged on opposite sides of the longer lateral surface thus formed, which permanent magnets have directions of magnetization perpendicular to the longer lateral surfaces and have a lower magnetic permeability than the central part.

This construction of the synchronous motor has the advantage that owing to the steps for improving the synchronous operation the axial dimensions of the motor do not become larger. In addition, the motor can be manufactured more economically. Moreover, motors with a nominal power rating higher than 25 W can also be constructed in an economic manner.

From DE-AS No. 12 61 235 it is known per se to construct the rotor of a low-power synchronous motor from two permanent magnetic elements between which a thin sheet is interposed. This thin sheet, however, serves only to form additional magnet poles at the positions in which like poles of the permanent-magnet elements are disposed opposite one another. However, this construction has no connection with the object of and the solution provided by the present invention.

In a further embodiment of the invention the air gaps between the permanent magnets and the stator are larger than the air gaps between the soft-magnetic central part and the stator.

As the geometry of the soft-magnetic part is such that the air gap between the iron rotor poles and the stator poles is as small as possible, the reluctance or, conversely, the permeance of the stator coils fluctuates distinctly during rotation of the rotor, because the permeance increases as the longitudinal axis of the soft-magnetic central part becomes oriented more in the direction of the stator field. When the central part is rotated out of the stator field the permeance decreases again. This fluctuations of the permeance reduce the angular-velocity fluctuations and consequently improve the synchronous operation. They increase when the air gap between the soft-magnetic part and the stator poles is minimal at its narrowest point.

In accordance with a further embodiment of the invention the soft-magnetic central part is cuboid. As a result of the present construction the permanent magnets produce a periodically alternating flux which depends on the rotor position in the stator coils in such a way that the magnetic flux is maximal when the inductance is minimal. In this way the alternating torques subtract from one another, the synchronous operation is improved, and, the motor operates more quietly and with less vibration.

In accordance with a further embodiment of the invention the air gap between the magnet rotor pole and the stator poles is dimensioned to be so large at its narrowest point that the natural frequency of the system which comprises the rotor and the load and which oscillates freely with with a low amplitude, which frequency is $$\omega_0 = \sqrt{\frac{2M_{KL}}{J}},$$

is unequal to the angular input voltage frequency $\omega_e$, $\omega_0$ being smaller than 0.9 to 0.8 $\omega_e$. $M_{KL}$ is the amplitude of the magnetic detent torques and J is the mass moment of inertia of the oscillating system. The air gap between the iron poles and stator poles should be as small as permitted by the manufacturing tolerances of the motor in accordance to obtain maximum fluctuations of the permeance and thereby improve the synchronous operation.

In accordance with a further embodiment of the invention the inductance minimum is shifted relative to the magnetic-flux maximum through an angle <90°. In this way the synchronous operation of the motor is optimized for the desired nominal load.

In a further embodiment of the invention the inductance fluctuations of the coils during rotation of the rotor are as large as possible. The synchronous operation improves as the motor complies better with this requirement.

DETAILED DESCRIPTION OF THE PREFERRED EMBODIMENTS

Figure 1:
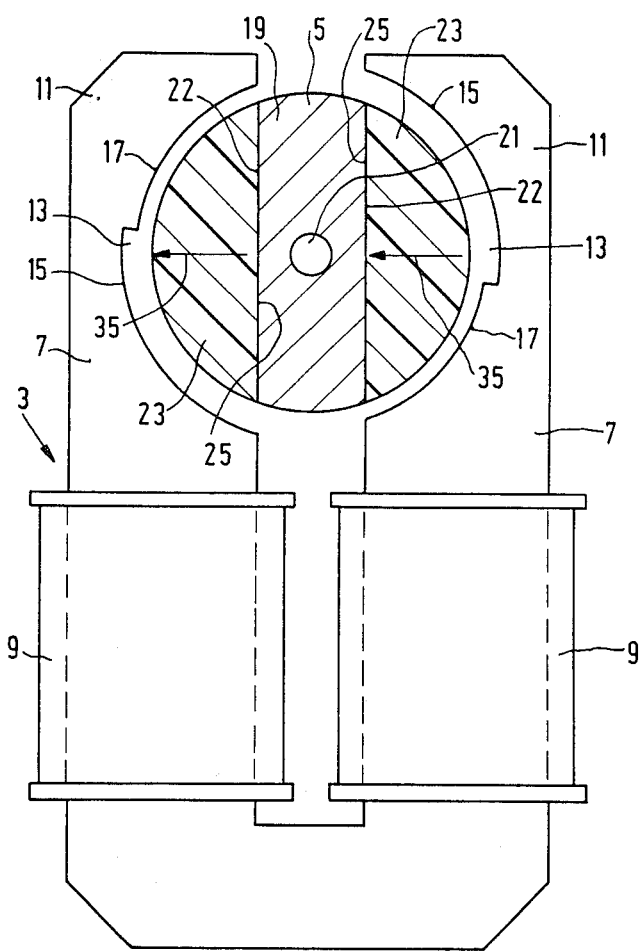
FIG. 1 shows a synchronous motor comprising a rotor made of laminated soft-magnetic and hard-magnetic materials.

FIG. 1 shows a single-phase synchronous motor comprising a stator iron 3 and a rotor 5. The stator iron 3 is U-shaped and exciter coils 9 are arranged on the limbs of the stator iron. Between the free ends 11 of the iron limbs 7 stator poles 13 are formed. The pole arcs of these stator poles 13 comprise a pole-arc portion 15 and a pole-arc portion 17, the radius of the pole-arc portions 15 being larger than the radius of the pole-arc portion 17. The rotor 5, which is mounted for rotation between the poles 13, is laminated. The central part 19 of the rotor, through which the rotor shaft 21 extends, is block-shaped and is made of a soft-magnetic material such as iron. Permanent magnets 23 of a hard-magnetic material are mounted on opposite sides of the central part 9 by means of an adhesive. The hardmagnetic material may be an anisotropic magnet material such as barium ferrite or a rare earth material. The interfaces 25 between the central part 19 and the permanent magnet 23 extend parallel to and on opposite sides of the axis of the rotor 5. The soft-magnetic central part 19 is basically rectangular.

As the rotor 5 revolves, the permanent magnets 23 periodically produce an alternating flux in the stator coils, which flux depends on the rotor position. The inductance L of the stator coils, i.e. the ratio between the flux generated by a coil current and the coil current itself also depends periodically on the rotor position $\theta$ $$L(\theta) = \frac{\phi(\theta)}{i(t)}$$

If these alternating fluxes are such that the magnetic flux is maximum when the inductance of the coils 9 is minimal, the alternating torques produced by the permanent magnets and the alternating torques produced by the inductance variations subtract from one another under no-load conditions. However, during operating conditions it is more favourable if the inductance minimum is shifted through an angle <90°, relative to the magnetic-flux maximum. In general, it is advantageous if the inductance fluctuations of the coils during rotation of the rotor are as large as possible. The alternating components of the torques subtract from each other because the magnetic torque i(t) $\phi_m \sin \theta$ and the reluctance torque $$\frac{1}{2} i(t)^2 \frac{dL}{d\theta}$$

are appropriately shifted in phase.

Figure 2:
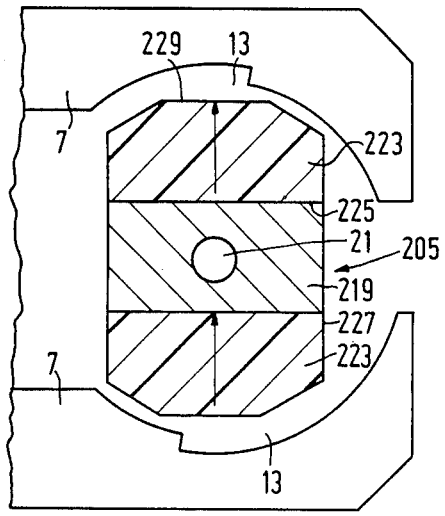
FIGS. 2 to 4 show a synchronous motor comprising a laminated rotor as shown in FIG. 1 and different peripheral surfaces.
Figure 3:
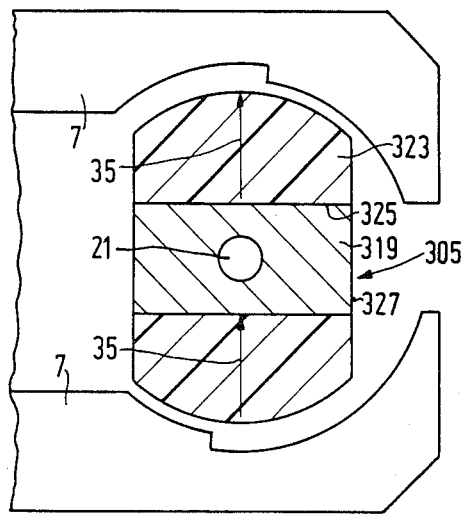
Figure 4:
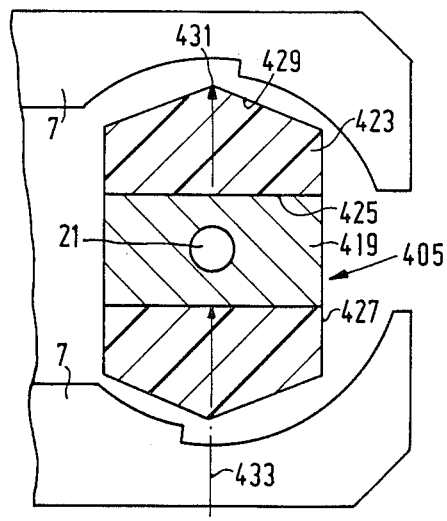

FIG. 2 to 4 show different rotor shapes for which the desired object is also achieved. The rotor 205 shown in FIG. 2 again comprises a soft-magnetic central part 219 with permanent magnets 223 arranged on opposite sides of the central part. The interfaces 225 between the soft-magnetic and hard-magnetic parts extend parallel to and on opposite sides of the rotor shaft 21. The permanent magnet segments 23 are magnetized perpendicular to the interfaces 225. The rotor is flattened perpendicularly to the interfaces to form flat rotor surfaces 227, which extend perpendicularly to the interfaces 225. Further flat surfaces 229 on the rotor periphery extend perpendicularly to the surfaces 227 and parallel to the interfaces 225.

The embodiment shown in FIG. 3 basically corresponds to that shown in FIG. 2. The soft-magnetic central part 319 is separated from the permanent magnets 323 on opposite sides of the central part 319 along interfaces 325. The rotor periphery is flattened perpendicularly to the interface 325 to form parallel lateral surfaces 327.

FIG. 4 shows another rotor with a differently shaped peripheral surface. Again permanent magnets 423 are arranged on opposite sides of a soft-magnetic central part 419 from which they are separated by interfaces 425. The periphery is flattened perpendicularly to the interfaces 425 to form peripheral surfaces 427. The permanent magnets 423 have roof-shaped peripheral surfaces 429, the apices 431 of surfaces 429 being situated in a median plane 433 of the rotor.

In all the above constructions the rotors are always magnetized in the same sense perpendicularly to the interfaces. This magnetization in the same sense is indicated by the arrows 35.

The flat surfaces on the rotors shown in FIGS. 2 to 4 are preferably formed by grinding.

Figure 5:
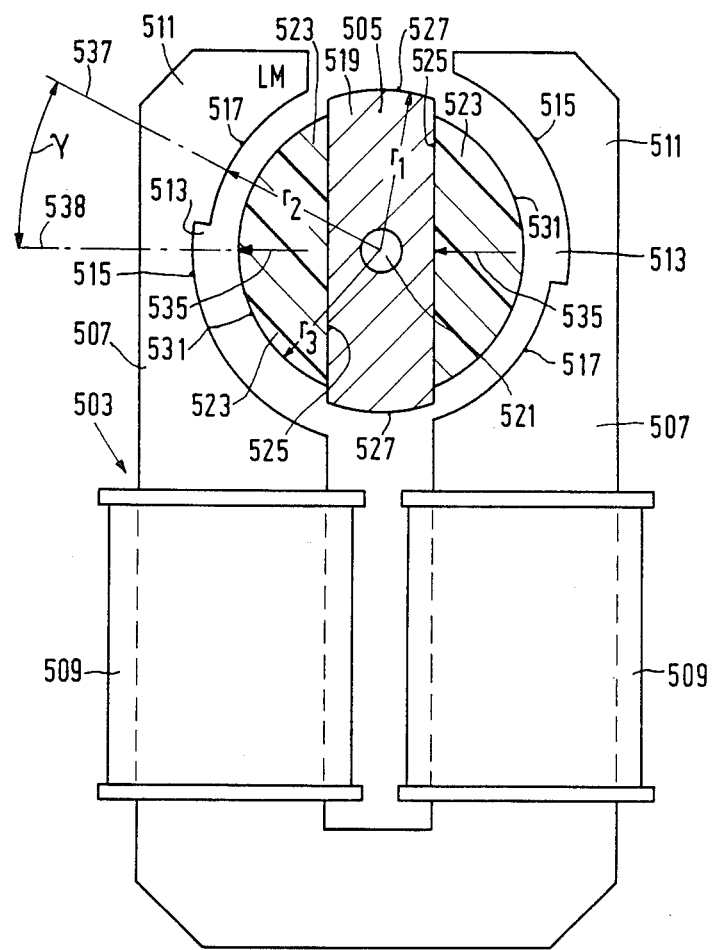
FIG. 5 shows a single-phase synchronous motor comprising a laminated rotor of soft-magnetical and hard-magnetic materials, the peripheral surfaces of said soft-magnetic and hard-magnetic materials forming different air gaps with the stator poles.

A single-phase synchronous motor 25 shown in FIG. 5 comprises a stator iron 503 and a rotor 505. The stator iron 503 is U-shaped. Exciter coils 509 are arranged on the limbs 507 of the stator iron. Between the free ends 511 of the iron limbs 507 stator poles 13 are formed. The pole arcs of these stator poles 513 each comprise a pole-arc portion 515 and a pole-arc portion 517, the radius of the pole-arc portion 515 being larger than the radius of the pole-arc portion 517. The rotor 505, which is mounted for rotation between the poles 513, is laminated. The central part 519 of the rotor, through which the rotor shaft 21 extends, is made of a soft-magnetic material, such as iron. Permanent magnets 523 of a hard-magnetic material are mounted on opposite sides of the central part 519 by means of an adhesive. The hard-magnetic material may be a rare-earth material, such as samarium-cobalt or neodynium-iron-boron. The interfaces 525 between the soft-magnetic central part 519 and the permanent magnets 523 extend parallel to one another on opposite sides of the axis of the rotor 505 and the rotor shaft 521. The soft-magnetic central part 519 is consequently rectangular, the external pole faces 527 being spherical or partly cylindrical.

The pole faces 527 of the soft-magnetic central part 519 are far enough from the rotor shaft 521 that the difference between their radius $r_1$ and the radius $r_2$ of the pole-arc portions 517 is minimal. The difference between $r_1$ and $r_2$ should be as small as possible, taking into account the manufacturing tolerances. The effect of this step increases as the distance between the pole faces 527 and the pole-arc portions 517 decreases.

The pole faces 531 of the permanent magnets 523 have a radius $r_3$ which is smaller than the radius $r_1$ of the pole faces 527 of the soft-magnetic central part. The air gap between the pole-arc portions 517 and the pole faces 527 is consequently smaller than the air gap between those portions and the pole faces 531. This air gap between the pole-arc portions 517 and the pole faces 531 is designated $L_M$ in FIG. 5. This air gap $L_M$ should be so large that the detent torque of the motor decreases to a value for which the transient oscillations occur below the voltage at which the motor can start in view of its dimensioning and its load, i.e. the transient oscillations should not occur at a higher voltage. This is the case if the natural frequency of the system which comprises the rotor and the load and which oscillates freely with a low amplitude, which frequency is $$\omega_0 = \sqrt{\frac{2M_{KL}}{J}}$$

is unequal to the angular input voltage frequency $\omega_e$. Preferably, $\omega_0$ should be smaller than 0.9 to 0.8 $\omega_e$.

During rotation of the rotor the differently dimensioned air gaps $L_M$ between the pole-arc portions 507 and the magnetic-pole faces 531 and between the pole-arc portions 517 and the iron-pole faces 527 results in a fluctuating reluctance or a strongly fluctuating permeance for the stator coils whilst at the same time the detent torque amplitude $M_{KL}$ is limited.

Arrows 535 indicate a diametral rotor magnetization in the same sense at the location of the permanent magnets 523. It is also possible to concentrate the lines of field of the permanent magnets 523 in the central area of the magnet-pole faces 531 in order to increase the asymmetry angle $\gamma$, where $\gamma$ is the angle between the direction of the stator fields 538 and the rotor position 537 when the stator coils are not energized.

In FIG. 5 the central position of the stator magnet fields is indicated by the line 538. The highest permeance for the stator coils 509 is obtained if the pole faces 527 of the soft-magnetic central part have been rotated to a position in which they are aligned with the stator field 538.

In the following embodiment, in which a maximum reluctance fluctuation is obtained by reducing the air gap between the soft-magnetic central part and the stator poles and in which transient oscillations are avoided by suitably enlarging the air gap between the hard-magnetic rotor components and the stator poles, it is attempted to obtain an easy to manufacture construction for the hard-magnetic rotor parts using different basic geometries and working methods. In addition, it is attempted to increase the asymmetry angle $\gamma$. Further the possibility is considered to make the phase shift between the rotor position corresponding to the maximum magnetic flux and the rotor position corresponding to the maximum reluctance unequal to 90° in order to adapt the improved synchronous operation to different loads.

Figure 6:
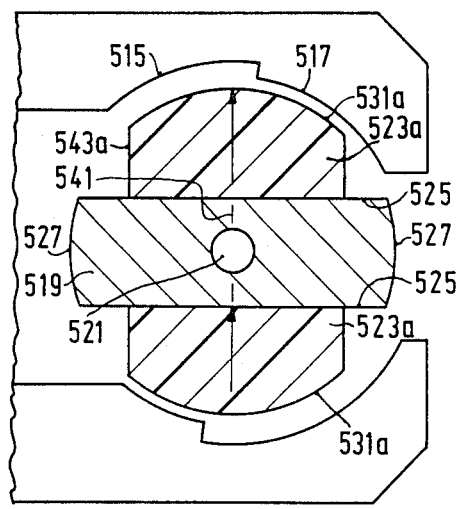
FIGS. 6 to 9 show peripheral surfaces which differ from the peripheral surface of the rotor shown in FIG. 1 and which satisfy the requirement of small air gaps at the soft-iron areas and larger air gaps at the location of the magnet material.

In FIG. 6 the permanent magnets 523a are recessed relative to the pole faces 527 of the central part 519 towards the center 541 of this part so that receding magnet segment faces 543a are formed. In this way the magnet-pole faces 531a of the permanent magnets 523a in FIG. 6 are shortened.

In FIGS. 7, 8, 9, 11, 12, and 13 there are recessed permanent magnet contact surfaces 543b, 543c, 543d, 543e, 543f and 543g corresponding to the receding permanent-magnet contact surfaces 543a.

Figure 7:
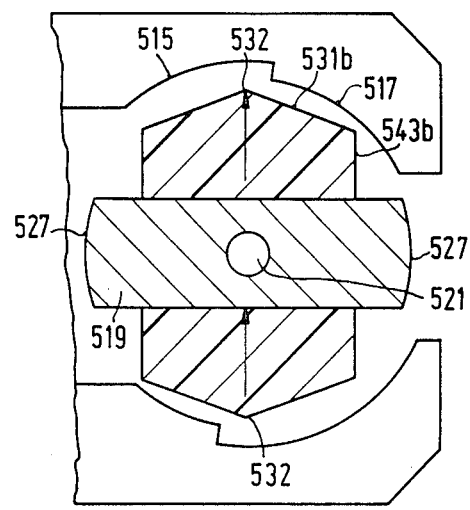
Figure 8:
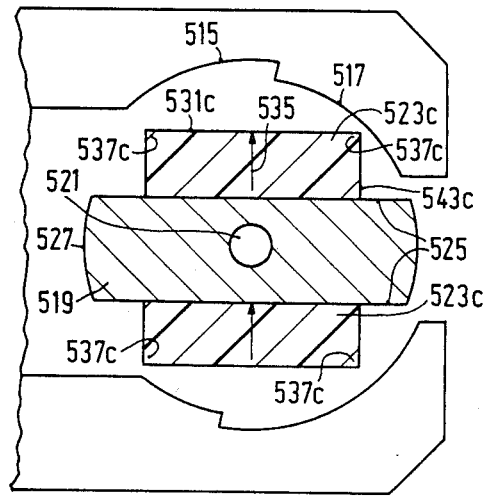
Figure 9:
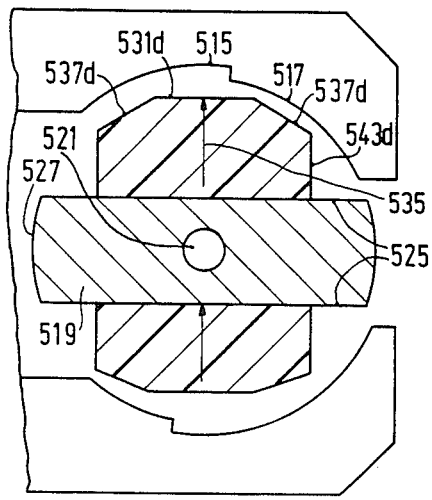

The rotors shown in FIGS. 6 to 9 are similar to each other except for the construction of the pole faces 531. The pole faces 531a, as shown in FIG. 6, are curved but the pole faces 531b shown in FIG. 7 have a roof shape with the apex at the location 532 in order to increase the angle of asymmetry $\gamma$. In FIG. 8 the permanent-magnet pole faces 531c of the permanent magnets 523c are flat, so that each magnet 523c comprises corner portions 537c which project towards the stator poles. In FIG. 9 the pole faces 531d are flat, as in FIG. 8, but bevelled portions 537d are formed for a better adaptation of the pole faces 531b fit to the shape of the pole-arc sections 515 and 517 of the stator iron.

Figure 11:
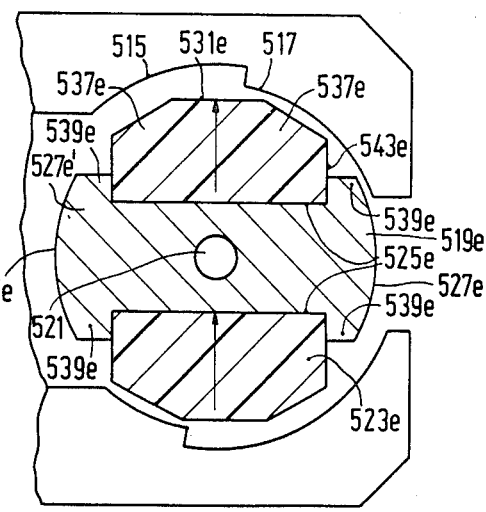
FIG. 11 shows a construction similar to that shown in FIG. 9, but in which the magnet material partly extends into the soft-magnetic central part.

Basically, the construction shown in FIG. 11 corresponds to that shown in FIG. 9. The permanent magnets 523e now extend into the soft-magnetic central part 519e. The iron pole face 527e is extended in the direction of rotation by pole portions 527e' which are arranged symmetrically relative to the longitudinal axis of the central part 519e. On the extended pole portions 527e of the soft-magnetic central part 519e portions 539e are formed which partly cover the faces 543e.

Figure 12:
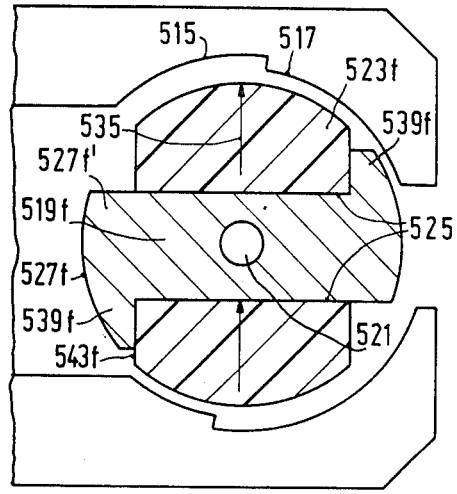
FIG. 12 shows a rotor comprising a soft-magnetic central part whose end portions to the right and the left of the hard-magnetic parts are formed as noses which project to one side.
Figure 13:
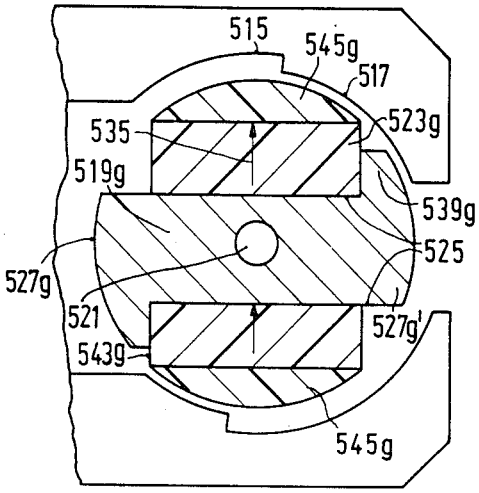
FIG. 13 shows a modification of the rotor shown in FIG. 12, in which the hard-magnetic parts are provided with soft-magnetic polepieces.

The same applies to FIGS. 12 and 13 where the iron pole faces 527f, 527g are extended in the direction of rotation by pole faces 527f', 527g' and the extended pole faces 27f', 27g' are formed on nose portions 539f, 539g of the soft-magnetic central part 519f, 519g, which partly cover the faces 543f and 543g. However, the nose portions 539f, 539g are no longer symmetrical but are situated on one side of the longitudinal axis of the central part 519f, 519g. This results in a phase shift between the reluctance variation and the magnetic-flux variation to provide an optimum improvement of the synchronous operation for specific operating conditions of the motor.

The difference between FIGS. 12 and 13 is that the magnet segments 523f and 523g are constructed differently. In FIG. 12 the magnet segments 523f are made in one piece, whilst the magnet segments 523g in FIG. 13 comprise a flat block on which a pole piece 545g is mounted.

Figure 10:
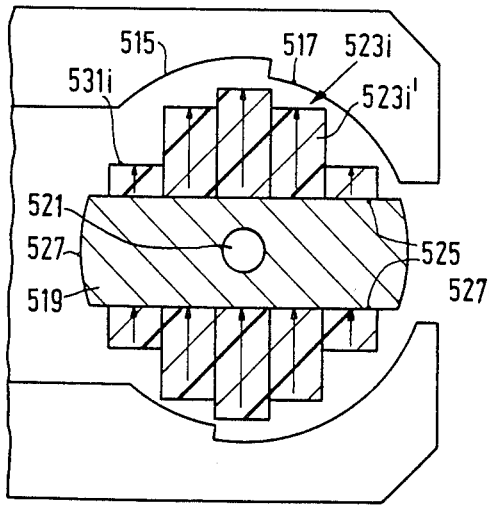
FIG. 10 shows a laminated rotor which is basically dimensioned as shown in FIGS. 5 to 9, the magnet material taking the form of separate blocks which are upended on the soft-magnetic central part.
Figure 14:
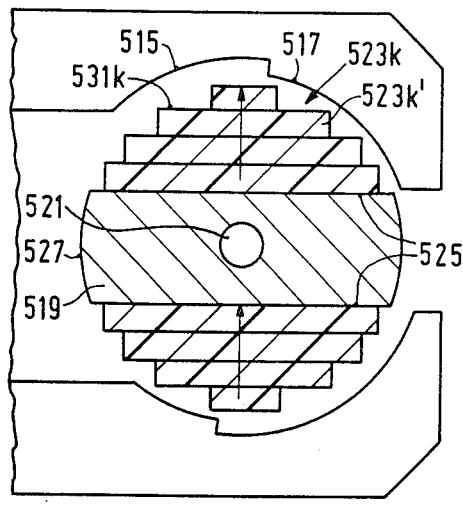
FIG. 14 shows a laminated rotor which is basically dimensioned as shown in FIGS. 5 to 9, the magnet material taking the form of separate blocks stacked onto the soft-magnetic central part.

In the embodiments shown in FIGS. 10 and 14 the magnet segments 523i and 523k are divided into separate blocks comprising pole portion faces 531i and 531k. The height of the individual permanent magnet blocks 523i' in FIG. 10 is selected in such a way that the faces 531i form stepped or stair case shapes in conformity with the shape of the pole-arc portions 515 and 517. The individual permanent-magnet blocks 523i' adjoin one another along the interface 525. In FIG. 14 the individual permanent-magnet blocks 523k' of the permanent magnets 523k are superposed parallel to the interfaces 25 and their lengths decrease stepwise in a direction parallel to the soft-magnetic central part, so that the pole faces 531k form a stepped structure in conformity with the curvature of the pole-arc portions 515 and 517.

In the embodiment shown in FIGS. 7, 10 and 14 the asymmetry angle $\gamma$ is enlarged to improve starting against friction.

What is claimed is:

1. A single-phase synchronous motor comprising a two-pole permanent-magnet rotor between two electromagnetically excited stator poles, the rotor comprising a soft-magnetic block-shaped central part which is diametrally-symmetrical relative to the rotor axis and which has a longer dimension and a shorter dimension transverse to the rotor axis, permanent magnets having magnet poles being arranged on opposite sides of the longer lateral surfaces thus formed, which permanent magnets have directions of magnetization perpendicular to the longer lateral surfaces and have a lower magnetic permeability than the central part, the air gaps between the permanent magnets and the stator being larger than the air gaps between the soft-magnetic central part and the stator.

2. A single-phase synchronous motor as claimed in claim 1, characterized in that the permanent magnets are made of barium-ferrite or a rare-earth material.

3. A single-phase synchronous motor as claimed in claim 1, characterized in that the permanent magnets are flattened parallel to their direction of magnetization.

4. A single-phase synchronous motor as claimed in claim 1, characterized in that the peripheral surface of the rotor is flattened parallel to the direction of magnetization of the permanent magnets.

5. A single-phase synchronous motor as claimed in claim 1, characterized in that the soft-magnetic central part is cuboid.

6. A single-phase synchronous motor as claimed in claim 5, characterized in that the peripheral surface of the rotor is roof-shaped at the locations of the permanent-magnet poles.

7. A single-phase synchronous motor as claimed in claim 1, characterized in that the natural frequency of the system which comprises the rotor and the load and which oscillates freely with a low amplitude, which frequency is $$\omega_0 = \sqrt{\frac{2M_{KL}}{J}},$$

is unequal to the angular mains frequency $\omega_e$ and the variation of the permeance during rotation of the rotor is maximal owing to a minimal air gap between the soft-magnetic central part and the stator poles, $M_{KL}$ being the amplitude of the magnetic detent torque and J being the mass moment of inertia of the oscillating system.

8. A single-phase synchronous motor as claimed in claim 7, characterized in that the natural frequency $\omega_0$ is smaller than 0.9 to 0.8 $\omega_e$ and the variation of the permeance is maximal as a result of a minimal air gap between the soft-magnetic central part and the stator poles.

9. A single-phase synchronous motor as claimed in claim 8, characterized in that the inductance minimum is shifted relative to the magnetic-flux maximum through an angle <90° (under operating conditions).

10. A single-phase synchronous motor as claimed in claim 9, characterized in that the permanent magnets are made of barium-ferrite or a rare-earth material.

11. A single-phase synchronous motor as claimed in claim 6, characterized in that the inductance minimum is shifted relative to the magnetic-flux maximum through an angle <90° (under operating conditions).

12. A single-phase synchronous motor as claimed in claim 1, characterized in that the inductance minimum is shifted relative to the magnetic-flux maximum through an angle <90° (under operating conditions).

13. A single-phase synchronous motor as claimed in claim 1, characterized in that the peripheral surface of the rotor is roof-shaped at the locations of the permanent-magnet poles.

* * * * *